United States Patent [19]

Moffatt

[11] Patent Number: 5,116,409
[45] Date of Patent: May 26, 1992

[54] BLEED ALLEVIATION IN INK-JET INKS

[75] Inventor: John R. Moffatt, Corvallis, Oreg.

[73] Assignee: Hewlett-Packard Company, Palo Alto, Calif.

[21] Appl. No.: 686,731

[22] Filed: Apr. 17, 1991

[51] Int. Cl.$^5$ ............................................. C09D 11/02
[52] U.S. Cl. ......................................... 106/22; 106/20
[58] Field of Search ........................ 106/20, 22, 23, 27

[56] References Cited

U.S. PATENT DOCUMENTS

| | | | |
|---|---|---|---|
| 3,642,502 | 2/1972 | Schneider | 106/23 |
| 4,026,713 | 5/1977 | Sambucetti et al. | 106/23 |
| 4,400,216 | 7/1983 | Arora | 106/23 |
| 5,019,166 | 5/1991 | Schwarz | 106/22 |

Primary Examiner—William R. Dixon, Jr
Assistant Examiner—Helene Klemanski

[57] ABSTRACT

Color bleed (the invasion of one color into another on the surface of the print medium) using ink-jet inks is alleviated by employing zwitterionic surfactants (pH-sensitive or pH-insensitive) or ionic or non-ionic amphiphiles. The inks of the invention comprise a vehicle and a dye. The vehicle typically comprises a low viscosity, high boiling point solvent, one or two amphiphiles at concentrations above their critical micelle concentration (cmc), while the dye typically comprises any of the dyes commonly employed in ink-jet printing. The amount of surfactant/amphiphile is described in terms of its critical micelle concentration (cmc), which is a unique value for each amphilphile. Above the cmc, micelles form, which attract the dye molecule and thus control the color bleed. Below the cmc, there is no micelle formation, and thus no control of the color bleed.

18 Claims, 3 Drawing Sheets

BLEED ALLEVIATION IN INK-JET INKS

TECHNICAL FIELD

The present invention relates to inks employed in ink-jet printing, especially in thermal ink-jet printing, and, more particularly, to colored ink compositions in which color bleed is substantially reduced or even eliminated.

BACKGROUND ART

Heavy dye loads on bond paper of various colored inks can lead to bleed and reduction of waterfastness. Bleed, as used herein, is the invasion of one color into another color on paper, which is a surface phenomenon. This is in contradistinction to uses of the term in the prior art, which tend to define "bleed" in the context of ink of a single color following the fibers of the paper; this is a sub-surface phenomenon.

Surfactants have been used as anti-clogging agents in Japanese Laid-Open Patent Application No. 63-165465 for use in ink-jet recording inks. The surfactants used in that application are limited to those having a surface tension between 20 and 50 dyne/cm. The amount of surfactant ranges from about 0.5 to 25 wt%. Specific examples disclosed include sodium dodecyl benzene sulfonate, sodium laurate, and polyethylene glycol monooleyl ether.

Japanese Laid-Open Patent Application No. 01-203,483 is directed to ink-jet recording compositions. Bleed reduction is mentioned in connection with printing using the inks. However, the compositions require pectin (0.01 to 2 wt%), which is probably being used as a thickener. However, pectin is not useful in inks used in thermal ink-jet printers, due to its thermal instability (it gels at higher temperatures).

Japanese Patent JO 1215-875-A is directed to inks suitable for ink-jet printing, evidencing good recording with fast drying without bleeding. The compositions all require triglycerides. Such compounds, however, are not stable to extended shelf life necessary for commercial inks.

Japanese Patent JO 1230-685-A is directed to inks suitable for ink-jet printing, evidencing quick absorption on the surface of conventional office paper without smear or blotting. The compositions comprise colorants and liquid solvents and/or dispersants and are characterized by the presence of a copolymer of ethylene oxide and propylene oxide of the formula $HO(C_2H_4O)_a-C_3H_6O(C_2H_4O)_bH$, where $a+b$ is up to 50 and b is optionally 0. These copolymers are referred to as "PLURONICS". For the most part, they have not been found to stop bleed.

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink to the medium. Inks suitably employed in such non-thermal applications often cannot be used in thermal ink-jet printing, due to the effect of heating on the ink composition.

A need remains for ink compositions for use in ink-jet printing, particularly thermal ink-jet printing, which do not evidence bleed, as defined herein, and yet which possess relatively long shelf life and other desirable properties of such inks.

DISCLOSURE OF INVENTION

In accordance with the invention, color bleed on paper media printed by ink-jet is alleviated by employing nonionic, pH-sensitive or insensitive zwitterionic (amphoteric) surfactants, or ionic surfactants (amphiphiles or detergents). The ink comprises (a) 0 to about 20 wt% of one or more low vapor pressure solvents (b) one or more water-soluble dyes, (c) one or more self-aggregating or performed micellar, vesicular-like components (particular examples and concentrations to be specified below), and (d) a filler such as water and a biocide, fungicide, and/or slimicide. As used herein, the term "low vapor pressure solvent" refers to a solvent having a vapor pressure that is lower than that of water and the term "water-soluble dye" refers to a dye whose solubility in water exceeds 2 wt%.

Low vapor pressure solvents can include, but are not restricted to, glycols such as ethylene glycol, diethylene glycol, triethylene glycol, tetraethylene glycol, propylene glycol, polyethylene glycol, polypropylene glycol, and derivatives thereof; diols such as butanediol, pentanediol, hexanediol, and homologous diols; glycol esters such as propylene glycol laurate; mono and di glycol ethers such as cellosolves, including ethylene glycol monobutyl ether, diethylene glycol ethers such as the carbitols, diethylene glycol mono ethyl, butyl, hexyl ethers, propylene glycol ether, dipropylene glycol ether, and triethylene glycol ether; long chain alcohols such as butyl alcohol, pentyl alcohol, and homologous alcohols; and other solvents such as sulfolane, esters, ketones, lactones such as $\gamma$-butyro-lactone, lactams such as N-pyrrolidone and N-(2-hydroxyethyl)pyrrolidone, and glycerols and their derivatives.

Microbial reagents include, but are not limited to, NUOSEPT (Nudex, Inc., a division of Huls Americal, UCARCIDE (Union Carbide), VANCIDE (RT Vanderbilt Co.), and PROXEL (ICI Americas).

Dyes include, but are not limited to, anionic water-soluble types such as C.I. Acid Blue 9 (#42090), C.I. Acid Red 18 (#18), C.I. Acid Red 27 (#16185), C.I. Acid Red 52 (#45100), C.I. Acid Yellow 23 (#19140), C.I. Direct Blue 199 (#74190), C.I. Direct Yellow (#29325) and their monovalent alkali earth ions such as $Na^{30}$, $Li^{30}$, $Cs^{30}$, $NH_4^+$, and substituted ammonium salts. The dye(s) is present from about 0.1 to 10 wt% of the ink.

It is important to note that some ingredients have dual functions. For example, n-butyl carbitol can function as a low vapor pressure solvent and as a self-aggregating component. Further discussion concerning the critical role of aggregation and concentration of surfactants in alleviating bleed is provided below. It is sufficient to state here that critical concentrations of surfactant are necessary to efficiently and completely prevent bleed in double dot mode printing used to generate the print samples herein.

BEST MODES FOR CARRYING OUT THE INVENTION

Figure 1:
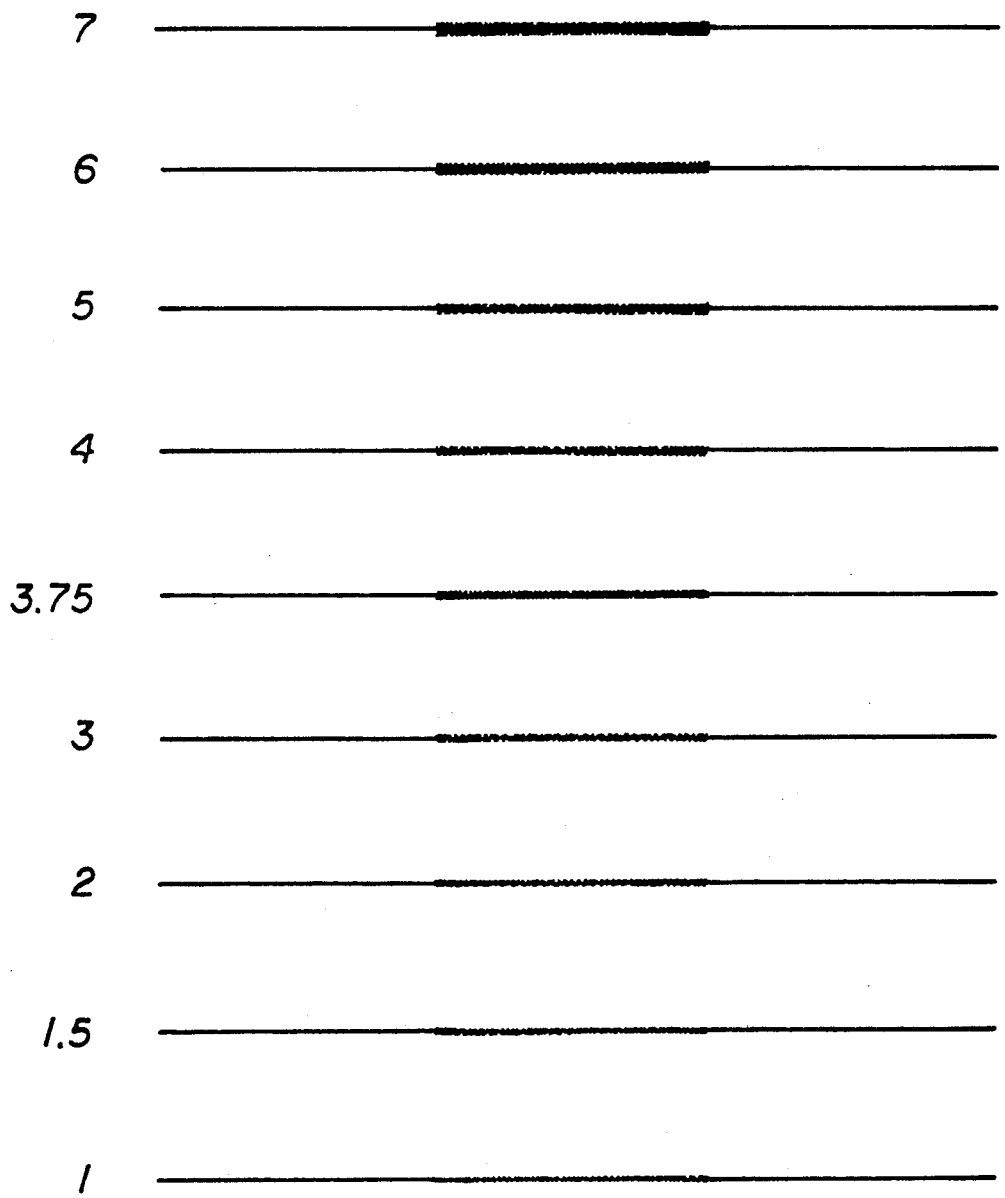
FIG. 1 shows bleed reference patterns where higher bleed indices reflect unacceptable bleed (a bleed score of <2.5 is considered to be acceptable for high quality text output)

In the practice of the invention, color bleed resulting from the use of ink-jet inks in thermal ink-jet printers is alleviated by employing either zwitterionic surfactants or non-ionic amphiphiles. The zwitterionic surfactants employed in the practice of the invention may be pH-sensitive or pH-insensitive.

All concentrations herein are in weight percent, unless otherwise indicated. The purity of all components is that employed in normal commercial practice for thermal ink-jet inks.

For convenience, examples of bleed alleviating surfactants are divided into two categories: (1) non-ionic and amphoteric and (2) ionic. The former class is further subdivided into three classes: (a) water-soluble amphiphile mimetics, such as STARBURST dendrimers, which are branched polyethylene amines available from Polysciences, Inc., and the like, (b) polyethers, such as ethylene glycol n-butyl ether, diethylene glycol n-butyl ether, diethylene glycol n-hexyl ether, triethylene glycol n-butyl ether, propylene glycol isobutyl ether, the TRITONS, which are nonyl phenyl polyethylene oxide surfactants available from Rohm & Haas Co., the PLURONICS and PLURAFACS, which are polyethylene oxide and polypropylene oxide block copolymers available from BASF, and the SURFYNOLS, which are acetylenic polyethylene oxide surfactants available from Air Products & Chemicals, Inc., and (c) amphoteric molecules, such as NDAO, NTAO, NHAO, OOAO, NOAO, and SB3-16; further information relating to these compounds is presented below. The ionic class, which comprises both cationic and anionic surfactants, also is represented by bile salts (sodium, lithium, ammonium, or substituted-ammonium cholate) and water-soluble dyes.

An example of a pH-sensitive zwitterionic surfactant is N,N-dimethyl-N-dodecyl amine oxide (NDAO), which has a $pk_a$ in water of about 2.3:

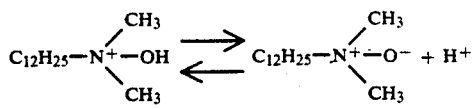

This compound has a molecular weight of 229, and a critical micelle concentration (cmc; to be discussed in greater detail below) of 13 mM.

Also, in place of the $C_{12}H_{25}$- moiety, any R moiety may be used. The following moieties, their name, abbreviation, molecular weight (mw), and cmc are useful in the practice of the invention:

N,N-dimethyl-N-tetradecyl amine oxide (NTAO); mw =257; cmc =6-8 mM;

N,N-dimethyl-N-hexadecyl amine oxide (NHAO); mw =285; cmc =0.8 mM;

N,N-dimethyl-N-octadecyl amine oxide (NOAO); mw =313; cmc =small;

N,N-dimethyl-N-(Z-9-octadecenyl)-N-amine oxide (OOAO); mw =311; cmc =small.

Another example is N-dodecyl-N,N-dimethyl glycine, which has a $pk_a$ of about 5 in water:

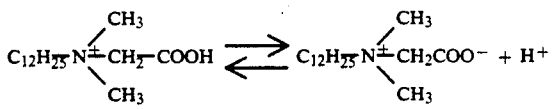

Yet other examples include phosphates, phosphites, phosphonates, lecithins or the like, and phosphate esters such as phosgomyelin which has a $pk_a$ of about 2 to 3 in

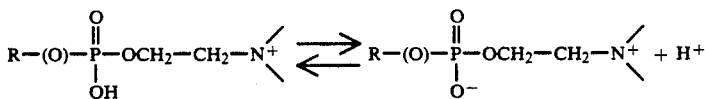

Other similar compounds include phosphoglycerides, such as phosphatidylethanolamines, phosphatidylcholines, phosphatidyl serines, phosphatidylinositols, and B'-O-lysylphosphatidylglycerols.

Additional examples of compounds that are useful in the practice of the invention include the sulfobetaines, which are zwitterionic, but pH-insensitive:

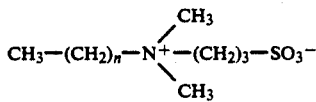

Where n=11, the compound is denoted SB3-12; where n=15, the compound is denoted SB3-16.

Examples of ionic surfactants that are suitably employed in the practice of the invention include such cationic compounds as

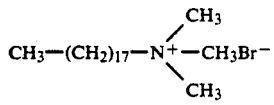

cetyl trimethylammonium bromide (CTABr), and such anionic surfactants as

CH$_3$-(CH$_2$)$_{11}$-O-SO$_3^-$Na$^+$ sodium dodecyl sulfate (SDS)
CH$_3$-(CH$_2$)$_n$-SO$_3^-$NA$^+$ sodium sulfonates Examples of non-ionic, non-amphoteric surfactants useful in the practice of the invention include compounds available under the tradenames TERGITOL, which are alkyl polyethylene oxides available from Union Carbide, and BRIJ, which are also alkyl polyethylene oxides available from ICI Americas, having the formula:

CH$_3$—(CH$_2$)—(—O—CH$_2$—CH$_2$—)$_m$—OH (where n=3 and m=2, this is n-butyl carbitol, a cellusolve).

Also included in this category are the PLURONICS and the PLURAFACS (BASF) having the general formula:

HO—(—CH$_2$—CH$_2$—O—)$_n$—(—CH$_2$—CH(CH$_3$-)$_m$—CH$_2$—CH$_2$—OH

The TRITONS (Rohm & Haas Co.) are generally represented as:
R—Ph—O(CH$_2$—CH$_2$—O)$_y$R′ where R, R′ is any alkane, alkene, aryl or alkynyl group or H, Ph is phenyl, y=1 to 50, and R is para to the ether linkage on the benzene ring.

The SURFYNOLS (Air Products & Chemicals, Inc.) are represented as

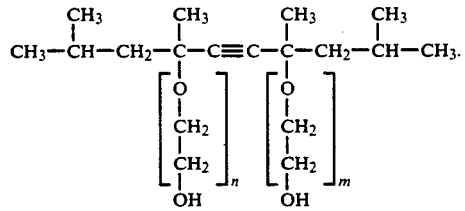

where n+m=0 to 50.

EXAMPLES OF BLEED ALLEVIATING AMPHIPHILES

Zwitterionic surfactants, such as NDAO, NTAO, OOAO, and NOAO, were tried first. These surfactants (except for NOAO) are totally miscible in aqueous solutions (about 0.1 to 20 wt%) of diethylene glycol, glycerol, and ethylene and propylene glycol. NOAO is also miscible if up to about 10 wt% of a straight chain primary alcohol, such as n-propanol, n-butanol, n-pentanol, is added.

Four examples are included in Table I. NDAO concentrations at 0, 0.5%, 1.0%, and 5% surfactant in water was the vehicle. The colors were simultaneously printed side by side using a dot-on-dot (double pass) algorithm. The dyes used were 1.33% C.I. Acid Red 27 (#16185); 1.65% C.I. Acid Blue 9 (#42090); 1.33% C.I. Direct Yellow 86 (#29325). Table 1 shows that without NDAO, massive proliferation of the colors occurs (bleed). NDAO at 0.5% radically alters the extent of bleed, but it is not eliminated. Table I also shows the effect of increased NDAO concentrations of 1% and 5%, respectively, concentrations which substantially eliminate bleed. Vehicles which contained 0 to 20% of di-ethylene glycol, propylene glycol, or glycerol or 0 to 15% 1,5-pentanediol gave similar results with NDAO at approximately the same concentrations (see Table III below, Ink #1). NOAO and OOAO required 0 to about 10% of a co-solvent, such as 1-propanol, 1-butanol, or 1-pentanol, for solubility purposes (see Table III below, Inks #6-11, 13-16, 25-27, 29, 30, 31, 33).

The color bleed index values listed in Table I are derived from the scale provided in FIG. 1, which is a print of lines of red (magenta) ink on a background of yellow ink. For high text quality output, a value of ≦2.5 is considered to be acceptable. For somewhat lower quality demands, such as printing on boxes, plotting, and the like, a value of about 3 to 4 may be considered to be acceptable. Inks commonly used commercially presently have values, typically, of about 6 or more.

TABLE 1

Bleed Indices for Various Systems.

| System[1] | Wt %[2] | Index[3] |
|---|---|---|
| NDAO | 0 | 6.0+ |
|  | 0.5 | 4.0 |
|  | 1.0 | 2.5 |
|  | 5.0 | 1.0 |
| n-pentanol; 1-5-pentanediol | 2.0; 6.0 | 6.0 |
| n-pentanol; 1,5-pentanediol; NDEC[4] | 2.0; 6.0; 2.0 | 2.0 |
| CTABr | 2.0 | 3.5 |
| DEG; CTABr | 6.0; 2.0 | 2.5 |
| SDS | 2.0 | 3.5 |
| n-butanol; 1,4-butanediol; SB3-16 | 2.0; 5.0; 8.0 | 4.0 |
| DEG; PLURONIC L-63 | 5.0; 5.0 | 2.5 |
| 1,5-pentanediol; SURFYNOL S465 | 10.0;.2.0 | 5.0 |
| 1,5-pentanediol; SURFYNOL S465 | 10.0; 4.0 | 2.0 |
| TRITON CF-21 | 0.7 | 6.0+ |
|  | 1.0 | 3.0 |
|  | 3.0 | 2.0 |
| DEG | 5.5 | 6.0 |
| n-butanol | 7.0 | 5.0 |

Notes:
[1]Dyes include AR27, 1.33%; DY86-Na, 1.33%; AB9-Na, 1.65%.
[2]wt %, balance is water.
[3]Color Bleed Index; a value of ≦2.5 is considered acceptable for high quality text output.
[4]N,N-dimethyl-N-dodecyl-N-(ethyl carboxylate).

Also shown in Table I is an example in which the vehicle consisted of 2% n-pentanol and 6% 1,5-pentanediol or of 7% n-butanol. The use of such paper wetting and penetrating solvents in the inks alone does not alleviate bleed.

Table I shows the effect of employing a (betaine) zwitterionic surfactant (NDEC) in conjunction with a vehicle of 2% n-pentanol and 6% 1,5-pentanediol in stopping bleed. The addition of NDEC surfactant markedly reduces the extent of bleed, as compared to the vehicle without surfactant.

Not all zwitterionic surfactants are efficient at eliminating bleed. For example, a system comprising 2% n-butanol, 5% 1,4-butanediol, and 8% SB3-16 is not efficient as the other examples in alleviating bleed. On the other hand, while bleed is still present, it is reduced compared to that in which the vehicle is 5.5% DEG, where no surfactant was present.

Small amounts of cationic surfactants in ink also eliminate bleed. A degree of bleed control (3.5) is achieved using 2% cetyl trimethylammonium bromide (CTABr) in water. The addition of co-solvent to the vehicle, specifically 6% diethylene glycol with CTABr present at 2%, provides even better bleed control (2.5) than afforded with CTABr alone.

Anionic surfactants in inks can control bleed as well. For example, 2% sodium dodecylsulfate (SDS) in water as vehicle controls bleed. Although the color bleed index is 3.5, such an ink would be acceptable for, e.g., plotters.

Only one non-ionic surfactant of the PLURONIC class, L-63, has been found to prevent bleed when present in the ink (see Table I).

Table I shows the effect of increasing SURFYNOL 465 concentration on eliminating bleed: 2% SURFYNOL 465 is not effective, but, 4% SURFYNOL 465 controls bleed well in ink vehicles containing 10% 1,5-pentanediol solvent.

Increasing concentrations of TRITON CF-21 detergent shows similar effects (cf. Table I).

These results show that different classes of surfactants exhibit concentration dependence on efficient bleed alleviation. Concentration effects were observed in the case of non-ionic surfactants, such as n-butyl carbitol, n-butyl propasol, and n-hexyl carbitol (not shown).

It is interesting to note common structural features among these bleed alleviating surfactants. All have features common among surfactants: long hydrocarbon (hydrophobic) tails with polar (hydrophilic) headgroups. Other such detergents of similar structures can be formulated in inks to solve bleed, provided they have structural features common to these. This does not imply that the bleed alleviating behavior is indigenous to all detergents.

The detection of the cmc or the onset of micellization in an ink can be determined by a number of methods. Typically, sharp changes are seen in plots of surface tension vs. surfactant concentration (in the ink) or osmotic pressure vs. surfactant concentration (in the ink). These sharp changes are attributed to the cmc. Other methods, such as conductivity, turbidity, determination of equivalent conductance are precluded in water-soluble inks.

Bleed Alleviation —Possible Mechanisms

Figure 2:
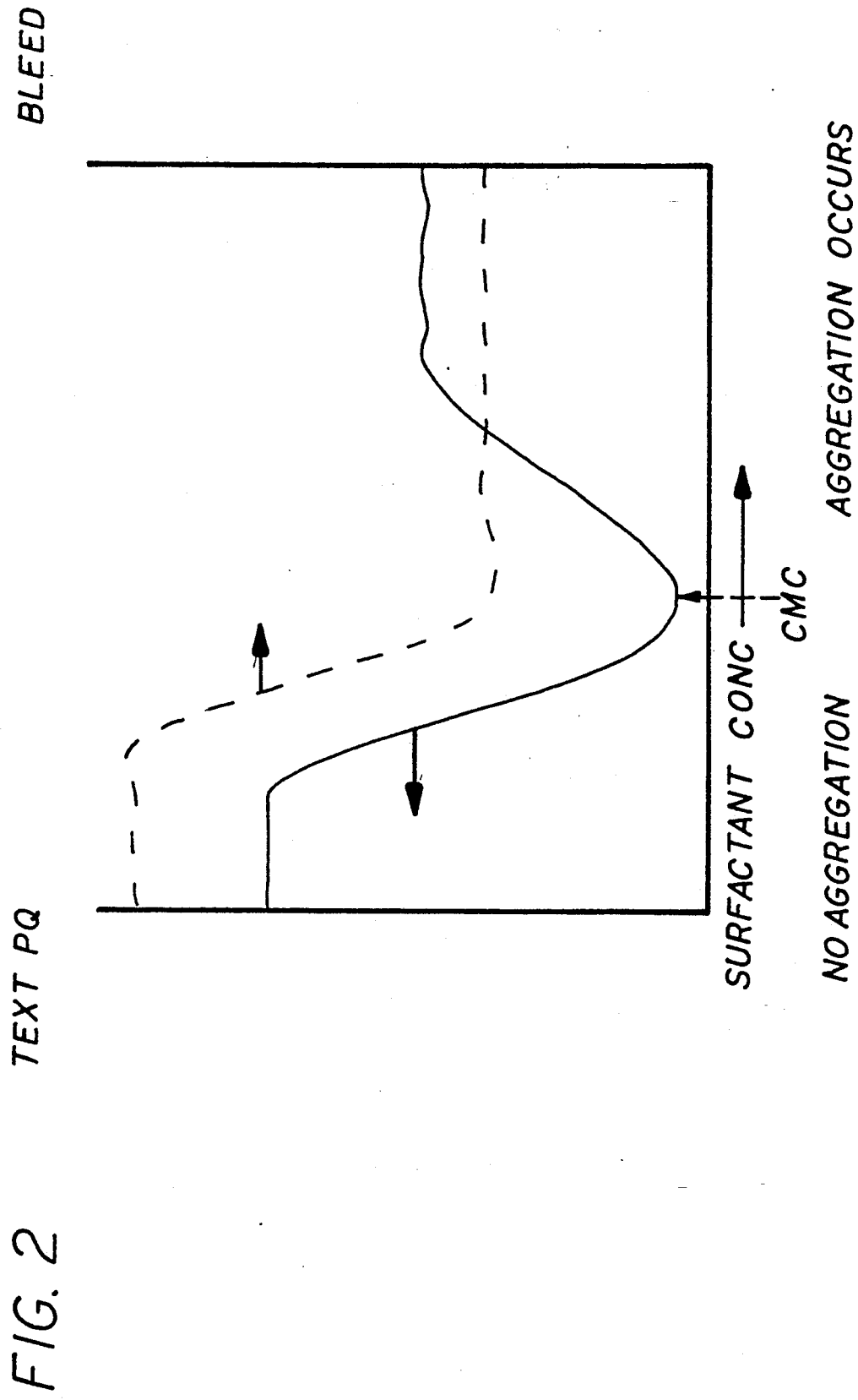
FIG. 2, on coordinates of text print quality (left abscissa) or bleed (right abscissa) and surfactant concentration, shows the qualitative effect on print quality and bleed as a function of concentration of a surfactant.

Reference to FIG. 2 gives a hypothetical concentration of surface-active reagent versus bleed and text print quality scale profiles. Basically, this Figure profiles the bleed and text quality responses observed for all surfactants under investigation. FIG. 2 assumes that other coponents of the ink vehicle and dye(s) concentrations are fixed and that the surfactant concentration is the dependent variable. From FIG. 2, upon addition of a small amount of surfactant, there is little change in the bleed control and sharpness of the text print quality. With further additions of surfactant, degradation of text print quality results with little or no improvement (perhaps even a slight degradation in bleed alleviation occurs in some cases) in bleed. A surfactant concentration is finally achieved where the quality of text begins to improve and bleed is reduced. Further decreases in bleed and improvement of text quality may occur with increasing surfactant concentration in the ink.

The lowest surfactant concentration where bleed alleviation and improvement of text print quality becomes appreciably effective is found to be near the critical micelle concentration (cmc) or critical monomer concentration of most surfactants. (The cmc is the concentration of surfactant where simple electrolyte or non-electrolyte chemistry lessens in importance to colloid chemistry. For the simple surfactants previously described, this is the concentration of surfactant where micelles, or aggregated surfactant molecules, begin to appear.)

Micellization is driven by entropic constraints - the hydrocarbon chains are driven into the interior of the micelle with the hydrophilic, water-soluble groups driven to the exterior. The resulting domainal fluid provides regions of olefin-rich and water-rich pockets, which can compartmentalize organic solutes such as dyes, co-surfactants, and co-solvent molecules, depending on their hydrophobicity. In addition, micelles interact and find regions in solution where their positional (potential) energy is minimized. It is conceivable that micelles containing charged dye molecules behave in a similar fashion.

Inspection of Table II shows that the cmcs listed here nicely coincide with the onset of bleed alleviation in Table I. The cmcs indicated are for pure water. The tabulated cmc will differ from those in the ink because added salts and hydrophobes perturb micelle structure.

TABLE II

CMC Data for Surfactant Print Samples

| | Mole wt. | [cmc][1], M | cmc[1], wt % |
|---|---|---|---|
| Class | | | |
| Surfactant | | | |
| Zwitterionic: | | | |
| NDAO | 229 | 0.013 | 0.3 |
| $C_{13}H_{27}N(CH_3)_2(CH_2)_2COO^-$ | 285 | 0.015 | 0.5 |
| SB3-12 | 335 | 0.012 | 0.4 |
| Ionic: | | | |
| CTABr | 364 | 0.0008 | 0.03 |
| SDS | 288 | 0.008 | 0.23 |
| Non-ionic: | | | |
| SURFYNOL 465 | 634 | 0.03–0.05 | 2–3 |
| TRITON CF-21 | 489 | 0.001 | 0.05 |
| N-42 | 389 | ca 0.001 | 0.04 |
| Butyl carbitol | 192 | 0.2–0.3 | 4–6 |

Note: [1]cmc in pure water at 25° C.

Incorporation of dyes into micelles is the probable method by which surfactant-containing inks control bleed. Micelles with dye of one color shot out of an ink-jet pen will not exchange dye of another color in an adjacent micelle on paper medium, because the rate at which the mobile medium evaporates or adsorbs into the paper is much faster than the desorption rate of the dye molecules from the micelles or the rate at which dye molecules diffuse through the micellar medium. Bleed alleviation results.

Figure 3A:
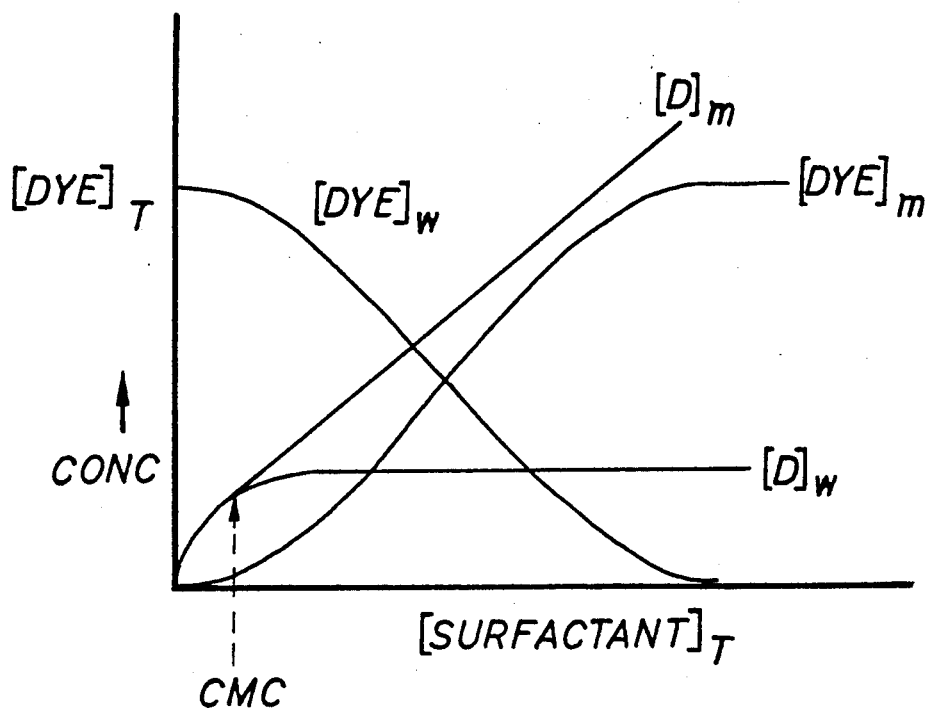
FIGS. 3a-b, on coordinates of dye concentration and total detergent (surfactant) concentration ($[D]_T$), are plots of dye adsorption to micelles, with FIG. 3a showing the effect of weak adsorption of dye to micelle and with FIG. 3b showing the effect of strong adsorption of dye to micelle, where $[D]_M$ is the detergent (surfactant) concentration in micelles and $[D]_W$ is the detergent (surfactant) concentration in water.
Figure 3B:
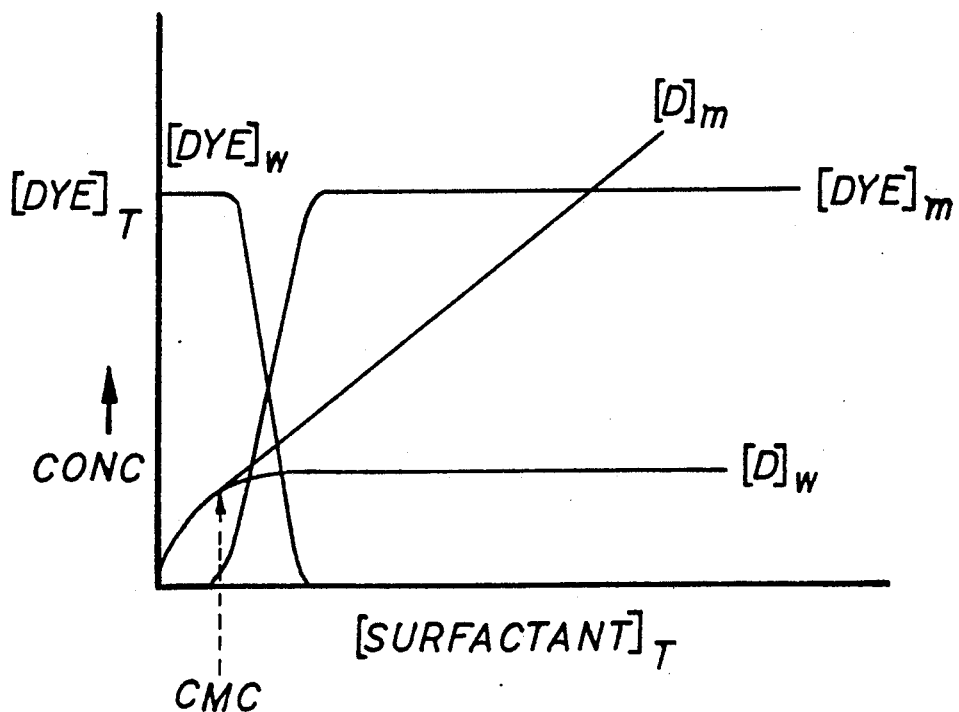

The efficiency of this bleed alleviation depends upon the level of adsorption of the dyes into the micelles, the number concentration of micelles in the ink, and the difusion of dye and micelles on the paper surface. FIGS. 3a and 3b show hypothetically the extent of adsorption of dye into micelles as a function of surfactant concentration for dye molecules that strongly adsorb to micelles (FIG. 3b) and for dye molecules that weakly adsorb (FIG. 3a). It will be noted that in the weakly adsorbing dye, a much higher surfactant concentration is necessary to bind the same amount of dye than in the case of the strongly adsorbing dye. Obviously, the propensity for dye to adsorb to micelles is a function of the structure (hydrophobicity) and interactions of the dye molecule, the surfactant, co-solvent, and co-surfactant (if any) present.

Thus, surfactant concentration affects bleed control. Higher concentrations of micelles absorb more dye molecules and slow their diffusion rate.

Additionally, certain pH-sensitive zwitterionic surfactants will pick up H+ from the paper and change it from a zwitterionic surfactant to a cationic one.

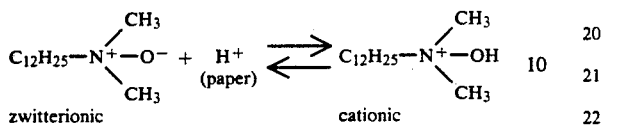

This occurs on the paper surface. Anionic dyes such as those mentioned above complex with this cationic surfactant on the paper surface to produce a water-insoluble complex of dye and surfactant, such as

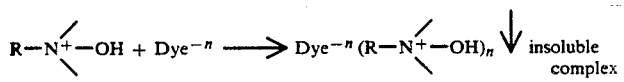

Because these insoluble complexes do not diffuse, bleed control is achieved.

INDUSTRIAL APPLICABILITY

The ink compositions of the invention are expected to find use in thermal ink-jet inks, especially color inks, where bleed of one color into another is a concern. The ink compositions of the invention reduce or even eliminate such color bleed.

EXAMPLES

The following inks were prepared, as listed in Table III, below (the dyes and dye concentrations were as listed above and the balance was water):

TABLE III

| Ink # | Amp1 | Amp2 | NaCh[1] | Solvent1 | Solvent2 |
|---|---|---|---|---|---|
| 1 | NDAO 1% | | | DEG 6% | |
| 2 | S465[2] 1.5% | | | DEG 6% | |
| 3 | S465 1.5% | | | DEG 10% | |
| 4 | NTAO 1.0% | S465 0.5% | | DEG 10% | |
| 5 | NDAO 2.5% | S465 1.0% | | DEG 10% | |
| 6 | NOAO 4% | | | DEG 3% | n-BuOH[3] 7% |
| 7 | OOAO 2% | | | DEG 6% | n-BuOH 2% |
| 8 | NOAO 4% | S465 0.5% | | DEG 6% | n-BuOH 7% |
| 9 | OOAO 2% | S465 0.5% | | DEG 6% | n-BuOH 2% |
| 10 | NOAO 4% | | | DEG 6% | n-BuOH 7% |
| 11 | OOAO 2% | S465 0.5% | 3.7% | DEG 6% | n-BuOH 2% |
| 12 | nBC[4] 6% | | | | |
| 13 | NOAO 4% | S465 1% | 0.5% | DEG 6% | n-BuOH 3% |
| 14 | NOAO 6% | nBC 6% | 2% | | n-BuOH 3% |
| 15 | OOAO 3% | S465 0.5% | 0.5% | DEG 6% | n-BuOH 3% |
| 16 | OOAO 3% | S465 0.5% | 0.5% | DPM[5] 6% | n-BuOH 3% |
| 17 | NOAO | S465 | | 1,4-BD[6] | |
| 18 | NOAO 6% | S465 0.5% | 2% | 1,4-BD 5% | |
| 19 | OOAO 6% | S465 1% | 2% | DEG 5% | |
| 20 | OOAO 6% | S465 0.5% | 0.5% | DEG 5.7% | |
| 21 | OOAO 3% | S465 0.5% | LiCh[7] 0.5% | DEG 5.7% | |
| 22 | L63[8] 6% | | | | |
| 23 | n-BuP[9] 5% | | | | |
| 24 | nBC 8% | | | | |
| 25 | OOAO 7% | | | 1,4-BD 5% | n-BuOH 2% |
| 26 | NTAO 7% | | | 1,4-BD 5% | n-BuOH 2% |
| 27* | OOAO 3% | S465 0.5% | | 1,5-PD[10] 6% | n-BuOH 3% |
| 28 | nBC 4% | nHC[11] 1% | | | |
| 29* | NOAO 4% | NHAO 6% | | 1,5-PD 6% | peOH[12] 2% |
| 30 | NHAO 7% | | | 1,4-BD 5% | BuOH 2% |
| 31 | OOAO 6% | S465 0.25% | 0.25% | 1,4-BD 5% | BuOH 1.75% |
| 32 | OOAO 3% | nBC 8% | 2.5% | | |
| 33* | NOAO 6% | OOAO 2% | | 1,5-PD 7% | peOH 2% |

Notes:
[1] sodium cholate
[2] SURFYNOL 465
[3] n-butanol
[4] n-butyl carbitol
[5] DOWANOL DPM (cellosolve of Dow Chemical Co.)
[6] 1,4-butanediol
[7] lithium cholate
[8] PLURONIC L-63
[9] n-butylpropasol
[10] 1,5-pentanediol
[11] n-hexyl carbitol
[12] n-pentanol
*These inks have a color bleed index of ≦2.5; the remaining inks have a color bleed index ranging from about 3 to 4.

What is claimed is:

1. A process for reducing color bleed in inks employed in thermal ink-jet printing, comprising printing a first ink on a medium followed by substantially simultaneously printing a second ink adjacent thereto, each said ink having the following composition:
   (a) a vehicle; and
   (b) about 0.1 to 10 wt% of at least one water-soluble anionic dye dissolved therein,
wherein said vehicle comprises (1) at least one member selected from the group consisting of zwitterionic surfactants and non-ionic amphiphiles, present in an amount that is at least equal to its critical micelle concentration; (2) 0 to about 20 wt% of at least one organic solvent which supports the micelle formation of said at least one member; and (3) the balance water, whereby invasion of one color by another is avoided.

2. The process of claim 1 wherein said zwitterionic surfactants are selected from the group consisting of non-ionic compounds and ionic compounds.

3. The process of claim 2 wherein said non-ionic compounds are selected from the group consisting of water-soluble amphiphile mimetics, polyethers, polyethylene oxides, acetyplenic backboned polyethylene oxides, and amphoteric compounds.

4. The process of claim 3 wherein said mimetics are branched polyethylene amines.

5. The process of claim 3 wherein said polyethers are selected from the group consisting of ethylene glycol n-butyl ether, diethylene glycol n-butyl ether, diethylene glycol n-hexyl ether, triethylene glycol n-butyl ether, and propylene glycol isobutyl ether.

6. The process of claim 3 wherein said amphoteric surfactants are pH-sensitive surfactants selected from the group consisting of N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide, N-dodecyl-N,N-dimethyl glycine, phosphates, phosphites, phosphonates, lecithins, phosphate esters, phospatidylethanolamines, phosphatidylcholines, phosphatidyl serines, phosphatidylinositos, and B'-O-lysylphosphatidylglycerols.

7. The process of claim 3 wherein said amphoteric surfactants are pH-insensitive surfactants comprising sulfobetaines.

8. The process of claim 2 wherein said ionic surfactants are selected from the group consisting of cetyl trimethylammonium bromide, sodium dodecyl sulfate, sodium sulfonates.

9. The process of claim 1 wherein said organic solvent is selected from the group consisting of glycols, diols, glycol esters, glycol ethers, long chain alcohols, sulfolane esters, ketones, lactones, and glycerols, and derivatives thereof and mixtures thereof.

10. The process of claim 9 wherein said solvent is selected from the group consisting of ethylene glycol, diethylene glycol, triethylene glycol, tetraethylene glycol, propylene glycol, polyethylene glycol, polypropylene glycol, and derivatives thereof; butanediol, pentanediol, hexanediol, and homologous diols; propylene glycol laurate; ethylene glycol monobutyl ether, diethylene glycol mono ethyl ether, diethylene glycol mono butyl ether, diethylene glycol mono hexyl ether, propylene glycol ether, dipropylene glycol ether, and triethylene glycol ether; butyl alcohol, pentyl alcohol, and homologous alcohols; $\gamma$-butyrolactone, N-pyrrolidone and N-(2-hydroxyethyl)pyrrolidone, and glycerols and their derivatives.

11. The process of claim 1 wherein said dye is a water-soluble anionic dye selected from the group consisting of C.I. Acid Blue 9, C.I. Acid Red 18, C.I. Acid Red 27, C.I. Acid Red 52, C.I. Acid Yellow 23, C.I. Direct Blue 199, and C.I. Direct Yellow 86.

12. The process of claim 11 wherein said anionic dye is associated with a cation selected from the group consisting of monovalent alkali earth ions, $NH_4^+$, and substituted ammoniun salts.

13. The process of claim 1 wherein said ink consists essentially of:
about 3wt% N,N-dimethyl-N-(Z-9-octadecenyl)-N-amine oxide;
about 0.5wt% of an acetylenic polyethylene oxide surfactant;
about 6wt% pentanediol;
about 3wt% n-butanol;
a dye selected from the group consisting of 1.33wt% Acid Red 27, about 1.33% Direct Yellow 86, and about 1.65wt% Acid Blue 9-Na; and
the balance water.

14. The process of claim 1 wherein said ink consists essentially of:
about 4 wt% N,N-dimethyl-N-octadecyl amine oxide;
about 6 wt% N,N-dimethyl-N-hexadecyl amine oxide;
about 6 wt% pentanedio;
about 2 wt% n-pentanol;
a dye selected from the group consisting of 1.33wt% Acid Red 27, about 1.33wt% Direct Yellow 86, and about 1.65wt% Acid Blue 9-Na; and the balance water.

15. The process of claim 1 wherein said ink consists essentially of:
about 6wt% N,N-dimethyl-N-octadecyl amine oxide;
about 2wt% N,N-dimethyl-N-(Z-9-octadecenyl)-N-amine oxide;
about 7wt% pentanediol;
about 2wt% n-pentanol;
a dye selected from the group consisting of 1.33wt% Acid Red 27, about 1.33wt% Direct Yellow 86, and about 1.65wt% Acid Blue 9-Na; and
the balance water.

16. A process for reducing color bleed in inks employed in thermal ink-jet printing, comprising printing a first ink on a medium followed by substantially simultaneously printing a second ink adjacent thereto, each said ink having the following composition:
(a) a vehicle; and
(b) 0.1 to about 10 wt% of at least one water-soluble anionic dye dissolved therein, wherein said vehicle comprises (1) at least one member selected from the group consisting of N,N-dimethyl-N-dodecyl amine oxide N,N-dimethyl-N-hexadecyl amine oxide, N,N-dimethyl-N-octadecyl amine oxide, N,N-dimethyl-N-(z-9-octadecenyl)-N-amine oxide, present in an amount that is at least equal to its critical micelle concentratio; (2) 0 to about 20 wt% of at least one organic solvent selected from the group consisting of pentanediol, pentanol, and butanol; and (3) the balance water, whereby invasion of one color by another is avoided.

17. the process of claim 16 wherein said dye is a water-soluble anionic dye selected from the group consisting of C.I. Acid Blue 9, C.I. Acid Red 18, C.I. Acid Red 27, C.I. Acid Red 52, C.I. Acid Yellow 23, C.I. Direct Blue 199, and C.I. Direct Yellow 86.

18. The process of claim 17 wherein said anionic dye is associated with a cation selected from the group consisting of monovalent alkali earth ions, $Nh_4+$, and substituted ammonium salts.

* * * * *